United States Patent
Jovet et al.

(10) Patent No.: US 10,513,165 B2
(45) Date of Patent: Dec. 24, 2019

(54) AIR-CONDITIONING DEVICE FOR A MOTOR VEHICLE

(71) Applicant: Valeo Systemes Thermiques, Le Mesnil Saint Denis (FR)

(72) Inventors: Bastien Jovet, Le Mesnil Saint-Denis (FR); Fabrice Ailloud, Le Mesnil Saint-Denis (FR); Frédéric Ladrech, Le Mesnil Saint-Denis (FR); Philippe Pierres, Le Mesnil Saint-Denis (FR)

(73) Assignee: Valeo Systemes Thermiques, Le Mesnil Saint Denis (FR)

(*) Notice: Subject to any disclaimer, the term of this patent is extended or adjusted under 35 U.S.C. 154(b) by 105 days.

(21) Appl. No.: 15/533,797

(22) PCT Filed: Nov. 24, 2015

(86) PCT No.: PCT/EP2015/077456
§ 371 (c)(1),
(2) Date: Jun. 7, 2017

(87) PCT Pub. No.: WO2016/091579
PCT Pub. Date: Jun. 16, 2016

(65) Prior Publication Data
US 2017/0320371 A1 Nov. 9, 2017

(30) Foreign Application Priority Data

Dec. 10, 2014 (FR) ..................... 14 62185

(51) Int. Cl.
*B60H 1/00* (2006.01)

(52) U.S. Cl.
CPC ....... *B60H 1/00564* (2013.01); *B60H 1/0005* (2013.01); *B60H 2001/00085* (2013.01); *B60H 2001/00164* (2013.01)

(58) Field of Classification Search
CPC ............. B60H 1/0005; B60H 1/00564; B60H 2001/00085; B60H 2001/00164
See application file for complete search history.

(56) References Cited

U.S. PATENT DOCUMENTS 4,453,591 A * 6/1984 Fehr ................... B60H 1/00064
165/202
5,975,191 A * 11/1999 Ohashi ............... B60H 1/00035
165/43

(Continued)

FOREIGN PATENT DOCUMENTS

DE 197 41 862 A1 3/1999
DE 10 2012 018537 A1 4/2014

(Continued)

OTHER PUBLICATIONS

International Search Report issued in PCT/EP2015/077456 dated Feb. 18, 2016 (2 pages).

(Continued)

*Primary Examiner* — Henry T Crenshaw
(74) *Attorney, Agent, or Firm* — Osha Liang LLP

(57) ABSTRACT

The invention relates to an air-conditioning device (1) for a motor vehicle, comprising an element for circulating air towards an evaporator (4), characterised in that the device (1) also comprises a bypass circuit (9) allowing air circulation between a zone located upstream of the evaporator (4) and a zone located downstream of the evaporator (4), the air bypass circuit (9) being arranged above the evaporator (4).

12 Claims, 1 Drawing Sheet

(56) References Cited

U.S. PATENT DOCUMENTS

| | | | |
|---|---|---|---|
| 6,048,263 A * | 4/2000 | Uchida | B60H 1/00064 165/204 |
| 2003/0094261 A1 * | 5/2003 | Abouchaar | B60H 1/0005 165/42 |
| 2007/0025846 A1 * | 2/2007 | Harman | F01D 5/141 415/206 |
| 2011/0036117 A1 * | 2/2011 | Frohling | B60H 1/00028 62/507 |
| 2013/0098595 A1 * | 4/2013 | Schall | B60H 1/0005 165/202 |
| 2015/0174985 A1 * | 6/2015 | Wawzyniak | B60H 1/0005 165/63 |
| 2016/0229265 A1 * | 8/2016 | Sawyer | B60H 1/26 |

FOREIGN PATENT DOCUMENTS

| | | |
|---|---|---|
| EP | 1 510 375 A1 | 3/2005 |
| FR | 2 788 021 A1 | 7/2000 |

OTHER PUBLICATIONS

Written Opinion of the International Searching Authority issued in PCT/EP2015/077456 dated Feb. 18, 2016 (5 pages).

* cited by examiner

AIR-CONDITIONING DEVICE FOR A MOTOR VEHICLE

The present invention concerns an air-conditioning device for a motor vehicle.

Motor vehicles are enclosed spaces of small volume, subject to changing and often rigorous environments. It is therefore essential to renew the air regularly and regulate its temperature.

To this end, air-conditioning devices or AC systems are used. These systems are designed such that the heated or cooled air is blown into the interior of the vehicle.

Air-conditioning devices for motor vehicles, in particular HVAC systems (Heating, Ventilation and Air Conditioning) generally comprise an air circuit between at least one intake orifice and at least one outlet orifice, on which various air treatment means are arranged. The air intake orifice is an external air inlet and/or a recycled air inlet. The air treatment means are in particular ventilation means for setting a flow of air in motion through the circuit, and means for heating and/or cooling, such as for example an air heating radiator and an evaporator intended to cool the air.

These air-conditioning devices, as described for example in document FR 2 708 021, typically comprise a bypass circuit allowing some of the air to not pass through the evaporator. The bypass circuit in particular brings an energy saving for the AC system.

The invention proposes an air-conditioning device which is equipped with such a circuit and is compact. This compactness is particularly desirable in AC systems with central architecture, situated in the central console of the motor vehicle.

The object of the invention is therefore an air-conditioning device for a motor vehicle, comprising an element for circulating air towards an evaporator. The device according to the invention also comprises a bypass circuit allowing air to circulate between a zone located upstream of the evaporator and a zone located downstream of the evaporator, the air bypass circuit being arranged above the evaporator.

The air circulation element comprises a centrifugal air duct envelope, called a shell.

Preferably, the centrifugal envelope is arranged above the evaporator.

The air bypass circuit is preferably arranged next to the shell.

This specific arrangement of the bypass circuit, above the evaporator and next to the shell, and not between the shell and the evaporator, means that the volume of the device need not be increased and the size of the shell need not be reduced.

The air circulation element comprises a motor actuating a wheel situated inside the shell.

The air bypass circuit advantageously comprises two conduits situated on either side of the shell.

The air bypass circuit may comprise a conduit situated below the motor of the air circulation element, and a conduit situated below an air inlet zone of the device.

The bypass circuit may be delimited by at least part of the wall of the shell, which advantageously allows a reduction in the space required for the device according to the invention.

The conduit situated below the motor of the air circulation element is advantageously equipped with a removable zone.

The degree of opening of the bypass conduits may be controlled by a flap comprising two parts, each intended to cover a bypass conduit.

According to a variant, the two parts of the flap are joined together by a shaft situated at an intermediate height between the lower end and the upper end of the flap, which is preferably of the butterfly type. More precisely, when each end of this shaft is connected to an edge of a respective part of the flap, the end of the shaft is at a distance from the ends of said edge to which the flap is fixed.

According to another variant, the degree of opening of the bypass conduits may also be controlled by a flap, preferably of the curtain type, said flap comprising two parts each intended to cover a bypass conduit, the two parts of the flap being joined together by a shaft.

Preferably, said shaft is connected to said parts of the flap at the level of their upper or lower end. More precisely, when each end of this shaft is connected to an edge of a respective part of the flap, the end of the shaft is connected to the corresponding part of the flap at the level of one of the ends of said edge to which the shaft is connected.

Finally, in another variant, the degree of opening of the bypass conduits may be controlled by a flap, preferably of the drum type, said flap comprising two parts each intended to corer a bypass conduit, each part having a section of arcuate form.

Advantageously, the evaporator is wider than the shell.

Further advantages and characteristics of the invention will appear from reading the description below which is given purely as a non-limitative example, with reference to the attached drawings on which:

Figure 1:
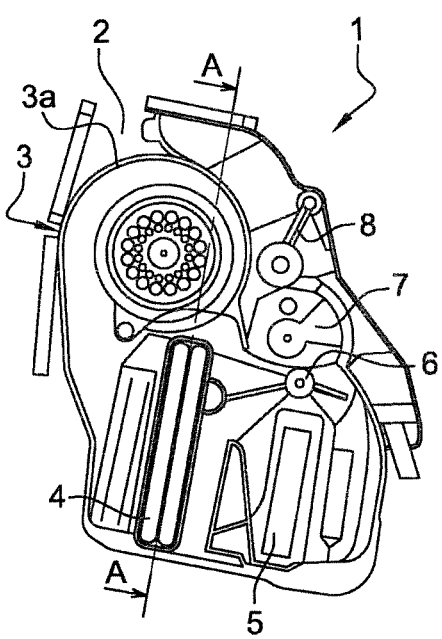
FIG. 1 is a side view of an air-conditioning device according to the invention.
Figure 2:
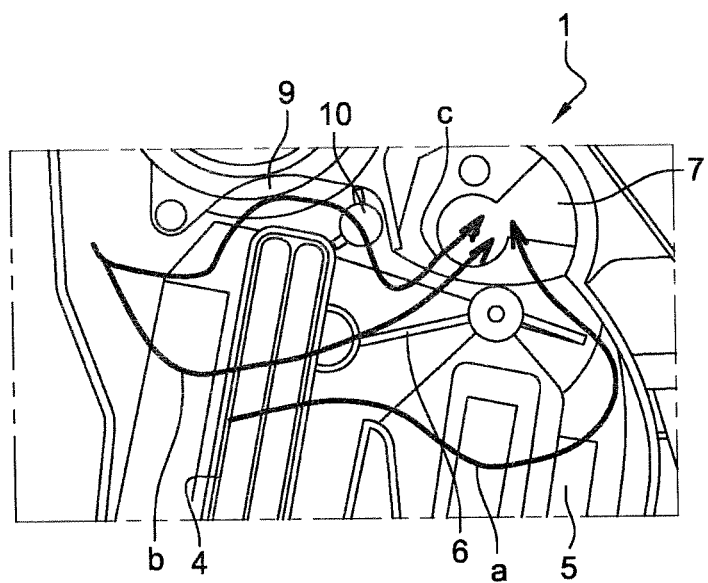
FIG. 2 is a view of a detail of FIG. 1.
Figure 3:
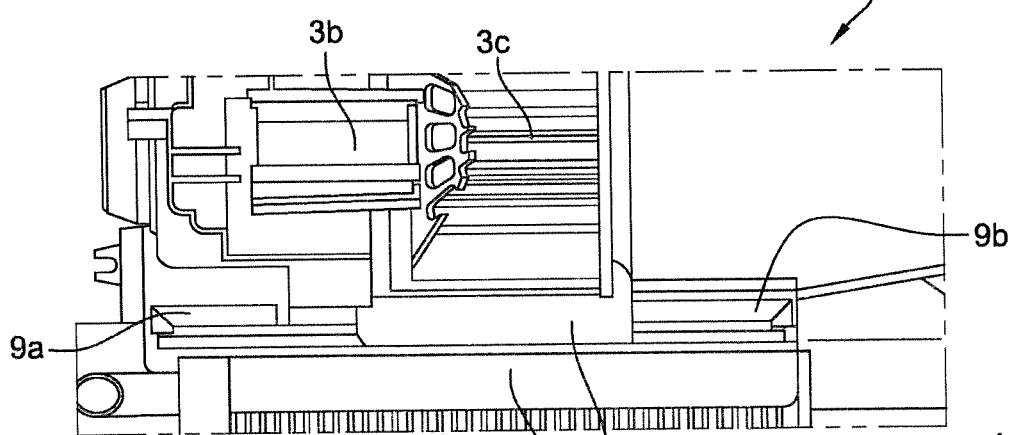
FIG. 3 is a view along section A-A of the device in FIG. 1.

As shown on FIGS. 1 to 3, an air-conditioning device 1 according to the invention comprises an air circuit, starting from at least one intake orifice 2 through which the air is drawn in. The intake orifice 2 is the external air inlet or the recycled air inlet. The air circuit comprises in particular an air circulation element such as an air pulser 3, able to set the air emerging from the intake orifice 2 in circulation towards a thermal processing zone which comprises an evaporator 4 and a radiator 5. The pulser 3 is equipped with a motor 3b which drives a wheel 3c situated inside an envelope 3a. The envelope 3a is a centrifugal air duct envelope, called a shell. The shell 3a is arranged above the evaporator 4; it is for example placed on the evaporator 4 or arranged near the evaporator 4. The shell 3a is preferably narrower than the evaporator 4.

The evaporator 4 is a heat exchanger. Its role is to absorb the flow of heat from the air to be cooled. The evaporation 4 thus comprises a liquid refrigerant fluid which is vaporized by the heat extracted from the air to be cooled. The radiator 5 is itself an exchanger in which the refrigerant passes from the gaseous state to the liquid state, transferring its heat to the external air.

Various flaps 6, 7, 8 allow the air to be oriented in several directions. A first mixing flap 6 allows the air flow which has passed through the evaporator 4 to be distributed towards the radiator 5 (pathway illustrated on FIG. 2 by arrow a), and/or towards a pathway bypassing the radiator 5 (pathway illustrated on FIG. 2 by arrow b). A second flap 7, for example a drum flap, distributes the air between a central air outlet towards the vents of the central console, and a lower air outlet in the direction of the driver's feet. A third flap 8 allows the air to be distributed between the central air outlet and an upper air outlet in the direction of the vehicle windscreen.

In addition, according to the invention, the air-conditioning device comprises a bypass circuit 9 which allows part of the air not to pass through the evaporator 4. The passage of the air using this bypass circuit is depicted on FIG. 2 by arrow c.

The bypass circuit 9 may comprise two bypass conduits 9a and 9b, both of which are arranged above the evaporator 4 and may be in contact therewith on either side of the shell 3a, i.e. the conduits 9a, 9b are aligned horizontally above the evaporator 4. The shell 3a is in contact with or immediately adjacent to the evaporator 4. Thus a bypass circuit 9a, 9b may be integrated in the air-conditioning device 1 without reducing the volume of the shell 3a, which allows good aerodynamic and acoustic performance to be retained. Also, it is not necessary to move the shell 3a upward to integrate the bypass circuit 9a, 9b.

The degree of opening of the bypass conduits 9a, 9b is controlled by a diversion flap 10, which is for example a butterfly flap (FIG. 2). The flap 10 may also be a curtain-type flap in which the shaft of the flat is situated at the lower or upper end of the flap 10. A curtain flap allows a gain in cross-section in the bypass conduits 9a, 9b. The flap 10 may also be a drum-type flap, like the second flap 7.

Figure 4:
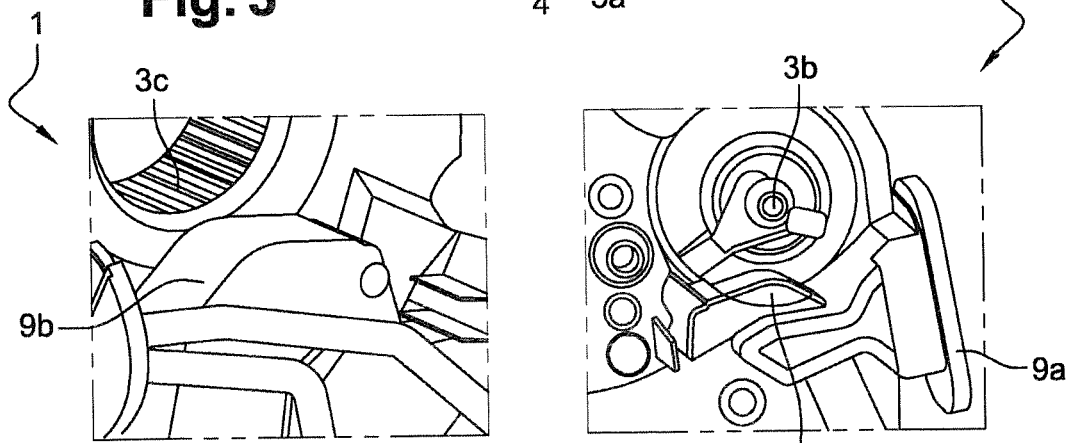
FIGS. 4 and 5 are partial views of the device.
Figure 5:
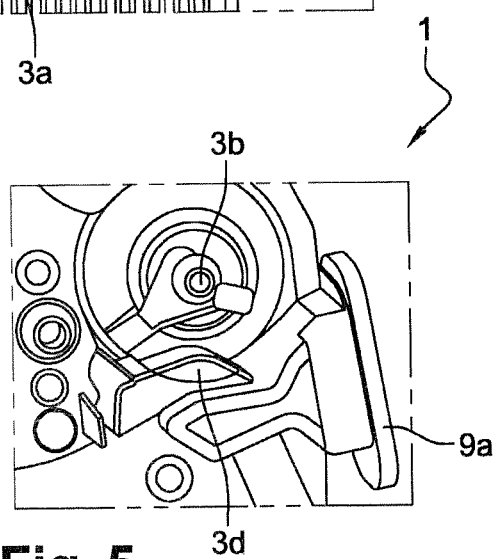

FIG. 4 illustrates the bypass conduit 9b which is situated close to the wheel 3c and below an air inlet zone of the air-conditioning device 1. The other bypass conduit 9a, which is situated below the motor 3b of the air pulser 3, is advantageously equipped with a removable portion 3d so as to allow dismantling of the motorized fan assembly composed of the motor support, the motor 3b and the wheel 3c, in the event of failure of the motorized fan assembly (FIG. 5).

The invention claimed is:

1. An air-conditioning device for a motor vehicle, comprising:
    an element for circulating air towards an evaporator; and
    an air bypass circuit allowing air to circulate between a zone located upstream of the evaporator and a zone located downstream of the evaporator,
    wherein the air bypass circuit is arranged above the evaporator, and
    wherein the air circulation element comprises a centrifugal air duct envelope, called a shell, that is curved with an increasing radius of curvature in a direction of air flow
    wherein the air bypass circuit is arranged next to the shell.

2. The air-conditioning device as claimed in claim 1, wherein the centrifugal air duct envelope is arranged above the evaporator.

3. The air-conditioning device as claimed in claim 1, wherein the air circulation element comprises a motor actuating a wheel situated inside the shell.

4. The air-conditioning device as claimed in claim 1, wherein the air bypass circuit comprises two conduits situated on either side of the shell.

5. The air-conditioning device as claimed in claim 3, wherein the air bypass circuit comprises a conduit situated below the motor of the air circulation element, and a conduit situated below an air inlet zone of the device.

6. The device as claimed in claim 5, wherein the conduit situated below the motor of the air circulation element is equipped with a removable zone.

7. The device as claimed in claim 4, wherein the degree of opening of the bypass conduits is controlled by a flap comprising two parts, each intended to cover a bypass conduit.

8. The device as claimed in claim 7, wherein the two parts of the flap are joined together by a shaft situated at an intermediate height between the lower end and the upper end of the flap.

9. The device as claimed in claim 7, wherein the two parts of the flap are joined together by a shaft at the level of the upper or lower end.

10. The device as claimed in claim 7, wherein the two parts of the flap each have a section of arcuate form.

11. The device as claimed in claim 1, wherein the evaporator is wider than the shell.

12. An air-conditioning device for a motor vehicle, comprising:
    an air circulation element for circulating air towards an evaporator, the air circulation element comprising a centrifugal air duct envelope, called a shell; and
    an air bypass circuit, arranged above the evaporator, allowing air to circulate between a zone located upstream of the evaporator and a zone located downstream of the evaporator,
    wherein the air bypass circuit comprises two bypass conduits situated on either side of the shell.

* * * * *